2,879,129
RECORDING ELECTRODE

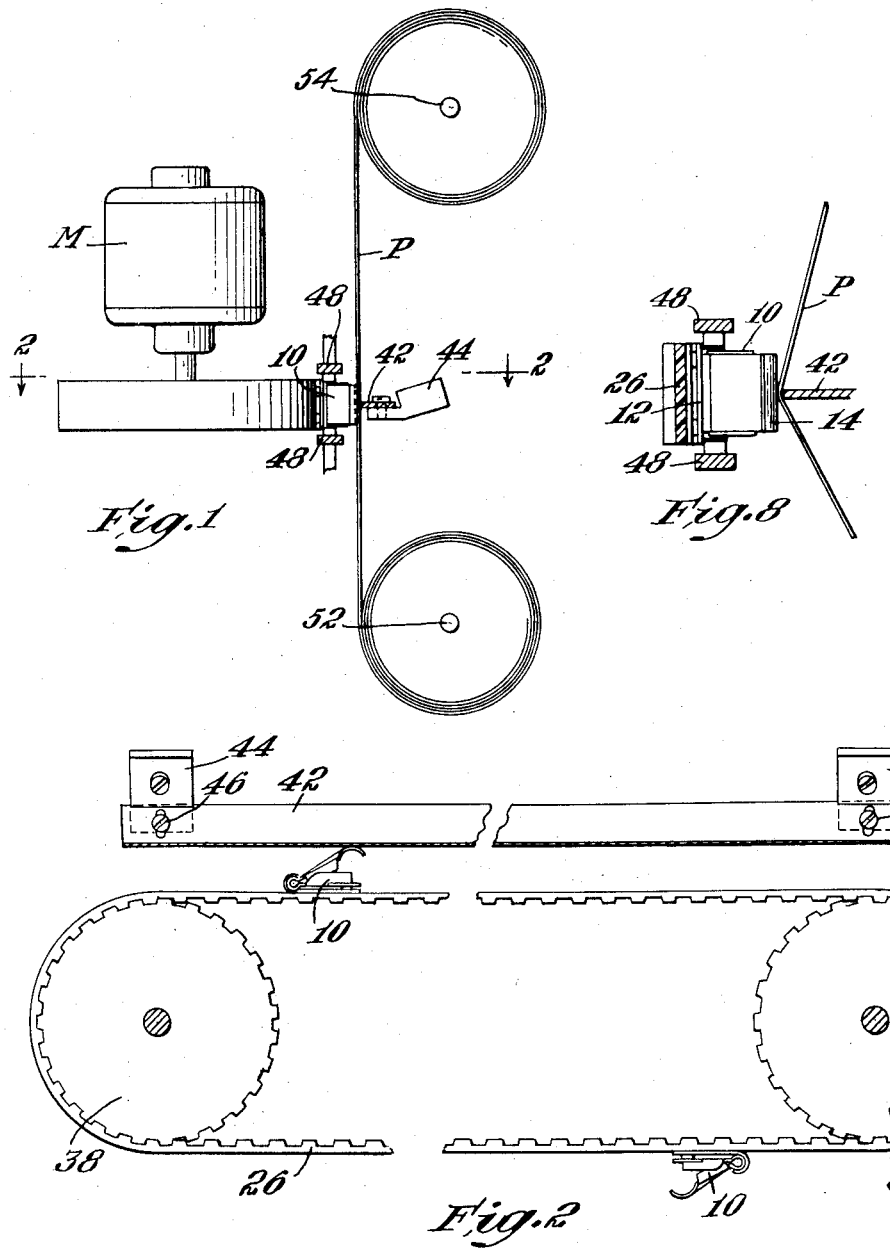

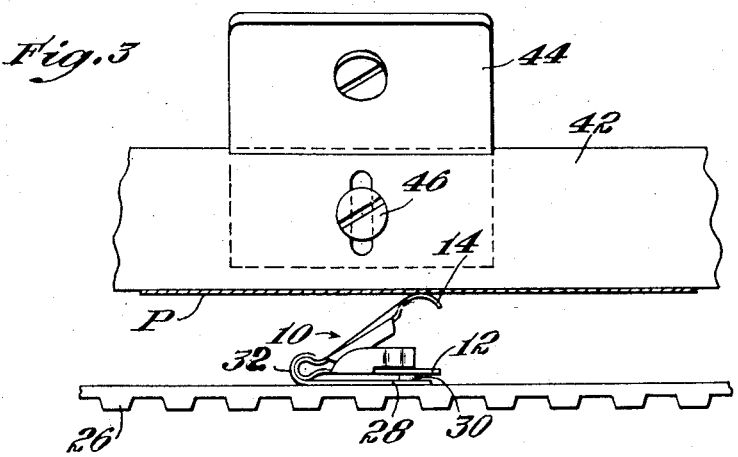
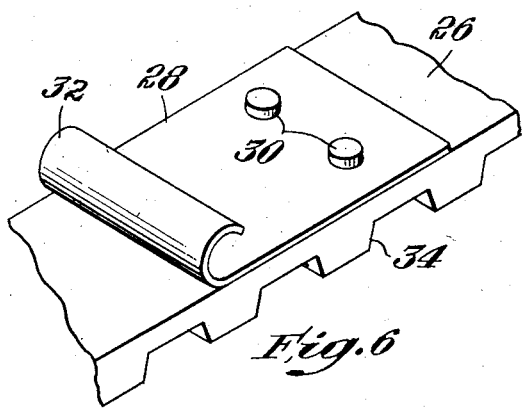
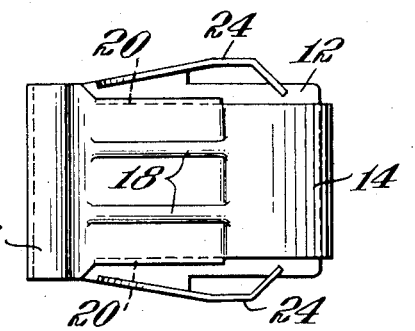
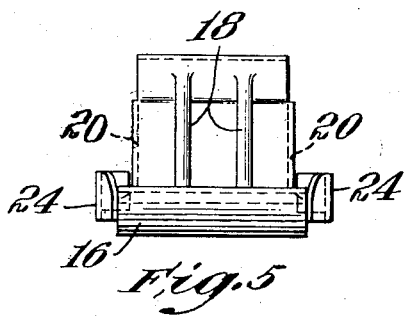
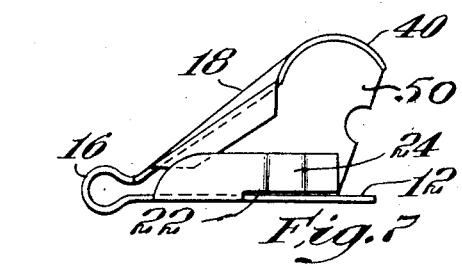

Milton Alden, Wellesley, Mass.

Application March 19, 1953, Serial No. 343,434

7 Claims. (Cl. 346—139)

In recorders of the type wherein one or more stylus electrodes are mounted upon a belt or chain which moves transversely to the direction of feed of the web of recording paper, the moving electrodes are critical elements which are subject to rapid wear, and if not carefully and continually serviced will result in a poor or defective record. As constructed heretofore, the stylus electrodes have been delicate devices which have been guided or held precisely so that they have required a minimum of operating clearance, further adding to the complexity of the recorder and necessity for frequent servicing. Furthermore, such electrodes have been difficult to replace, noisy in operation, and have required constant and careful adjustments by skilled operators to maintain proper contact pressure.

It is therefore the objects of this invention to provide a moving electrode for a recorder which is self-aligning, which is self-compensating for wear, which provides the proper recording pressure, which eliminates the necessity for close tolerances and precision fits, which is easily replaced, which is quiet in operation, which permits separate adjustment of the recording and current-carrying contacts, and which advances the recording art generally.

In accordance with my invention the moving electrode, which is preferably formed from a strip or sheet of a resilient electrical current-conducting material, includes a base member arranged to be pivotally connected to the moving belt of a recorder, for example, by means of a clip which is fixed to the belt. The clip has an arcuate end formed to engage a cylindrical portion of the electrode forming a spring which integrally connects one end of the base member with a corresponding end of an effective recording member. The base and recording members are maintained in angular relationship with respect to each other by the cylindrical spring so that the opposite effective end of the recording member, which is preferably arcuate, is brought into contact with the surface of the web of recording paper. The effective recording pressure is determined by the resiliency of the material from which the electrode is made, supplemented, if required, by the force exerted by a block of rubber interposed between the base and recording members. The electrode is guided by two resilient tabs one of which is located upon either side of the base member, respectively to engage two guides such as rails mounted in spaced relationship, for example, upon the frame or casing of the recorder. The guiding tabs are preferably formed integrally with the base member being bent substantially normally to the plane thereof, the bent portion on either side being undercut so that the tab is rendered more yieldable. The above construction makes it possible to vary the recording pressure and the drag due to the tab pressure independently of each other so that an optimum value of each is obtainable, and the proper recording pressure which virtually eliminates "bouncing" and "skipping" of the stylus can be selected without compromise. The drag can then be made great enough to eliminate backlash in the stylus carrying belt and the drive therefor. The belt is preferably made of an insulating material for quiet operation and isolation of the electrically conducting elements. Notches or teeth are preferably provided in either the belt or its driving pulley or in both to prevent loss of timing or synchronism of the stylus electrodes.

These and other objects and aspects will be apparent from the following description of a specific embodiment of the invention which refer to drawings wherein:

Fig. 1 is a schematic side view of a recorder incorporating the electrode;

Fig. 2 is a sectional view on line 2—2 of Fig. 1;

Fig. 3 is a fragmentary side elevation view of the moving electrode attached to the belt;

Fig. 4 is a plan view of the moving electrode;

Fig. 5 is an end view of the electrode;

Fig. 6 is an isometric view of the holding clip secured to the belt;

Fig. 7 is a side view of a modification of the moving electrode; and

Fig. 8 is an enlarged fragmentary view showing the manner in which the paper is fed between the blade and stylus.

As is best shown in Figs. 3 to 5, the moving electrode 10 which is the subject of the present invention is preferably formed from a blank of a resilient electrically conducting sheet material such as beryllium bronze. The blank is folded back upon itself to form a planar base member 12 which is integrally connected with an effective recording member 14 by means of a cylindrical spring portion 16. The recording member 14 is stiffened by two reenforcing ribs 18 and by turning down the two opposite sides to form the flanges 20. The opposite sides of the base member 12 are bent up substantially normally to the plane of the member. The bent portions are partially undercut as at 22 and the resulting free ends bowed out to form two guiding tabs 24 whose function will be described hereinafter.

Two or more moving electrodes 10 are pivotally attached to a driving belt 26 (Fig. 6) by means of respective holding clips 28 each of which is fixed to the belt by two rivets 30. One end 32 of the clip 28 is arcuate to engage the cylindrical portion 16 of the moving electrode 10 as is shown in Fig. 3. The inner side of the belt 26 is provided with notches 34 which engage cogs such as the teeth upon two spaced pulleys 36 and 38 (Fig. 2) so that there is no slippage of the belt as the pulley 36 is rotated by an electrical motor M (Fig. 1). The belt 26 is preferably made of an insulating material to reduce the noise and electrically isolate the driving motor M from the stylus electrodes.

The arcuate ends 40 of the separate electrodes 10 which are pivotally secured to the belt 26, as has been described in detail heretofore, are by the travel of the belt alternatively moved lengthwise of the edge of an elongated bar electrode such as the blade 42 (Figs. 1 and 2), although it is to be understood that other equivalent elongated electrodes, such as the moving strip shown in my United States Patent No. 2,621,999, filed March 11, 1950, may be substituted therefor. The illustrated blade 42 is carried by several supporting blocks 44 being secured thereto by screws 46 which pass through slotted apertures in the blades thereby to permit adjustment of the edge of the blade with respect to the moving electrodes 10. The blocks 44 are secured by the frame or casing (not shown) of the recorder. The position of the moving stylus electrodes 10 transversely to the web of paper P is determined by spaced elongated guides, such as the rails 48, which are also secured to the recorder frame. The crowned opposing surfaces of the rails 48 are engaged by the guiding tabs 24 (Fig. 4) which project from either side of the moving electrode 10 thereby to determine the path transversely to the web of recording paper traveled by the electrodes. The pressure exerted by the tabs 24 causes a drag which is transmitted to the belt 26 and motor M so that backlash is eliminated and the load imposed thereupon minimizes changes in speed. The guiding tabs 24 also serve as brushes for transmitting the input signal current from the rails 48 to the moving electrodes 10. As the spring force exerted by the deflection of the guiding tabs 24 by the rails 48 is substantially at right angles to the force exerted against the blade 42 and is therefore independent thereof, the recording pressure can be made an optimum for recording with a minimum of "bouncing" and "skipping" of the stylus. This recording contact pressure which is exerted upon a web of paper P interposed between the arcuate ends 40 of the respective moving electrodes 10 is determined by the spring constant of the cylindrical portion 16. If required, the contact pressure can be increased by the interposing of a block 50 of a resilient material, such as natural or synthetic rubber, between the base member 12 and the recording member 14 as is shown in the embodiment of Fig. 7.

As is best shown in Fig. 8, the width of the arcuate portion 40 of the recording member 14 is made considerably greater than the thickness of the blade 42 so that close manufacturing tolerances and a precision fit within the rails 48 are not required. As the width of the trace upon the recording paper P is determined by the thickness of the blade 42, it will be apparent that any movement of the stylus electrode 10 transversely of the blade due, for example, to irregularity of the guides will have no effect upon the recording so long as some part of the arcuate portion 40 is opposite the blade. It has also been found advisable to locate the supply and take-up reels 52 and 54 below a plane perpendicular to the blade and passing through the effective recording edge thereof so that the web of paper is depressed on either side of the blade, as is shown in Fig. 8, which minimizes "bleeding" or smearing of the edges of the trace.

In operation, the web P of any of the well known electro-sensitive recording papers is fed from a supply reel 52, between the bar 42 and the moving electrodes 10 to a take-up reel 54 which is driven by a conventional paper feed forming no part of the present invention. The driving motor M for the belt 26 is operated in synchronism with a transmitting unit (not shown) so that one of the moving stylus electrodes 10 makes a transverse movement of the paper web P for each scanning operation of the transmitting unit. The input signal from the transmitting unit is impressed across the blade 42 and the rails 48 so that a circuit is completed and the signal current flows through the moving electrode and the paper to cause a coloration thereof in the well known manner. The blade 42 is preferably made the more positive electrode and the rails 48 are connected to the negative side of the input signal source so that electro-deposition of metal takes place from the blade and the stylus electrodes are subject only to mechanical wear. No particular adjustment need be made to the moving electrodes 10 as the guiding tabs 24 act to center the arcuate portion 40 with respect to the blade 42. The recording pressure is determined by the deflection of the cylindrical portion 16 and the rubber block 50, if such is used. A uniform pressure throughout the entire movement of the electrodes is obtained by adjustment of the blade position with respect to its supporting block 44. Either electrode 10 may be quickly and easily replaced by an unskilled operator by disengaging the electrode from the corresponding clip 28 and substituting a new unit, the operation being so simple that it can be performed in a darkroom such as those wherein recording equipment is often located.

It should be understood that the present disclosure is for the purpose of illustration only and that this invention includes all modifications and equivalents which fall within the scope of the appended claims.

I claim:

1. In a recorder of the type having a moving belt guided to travel transversely of a web of recording paper; a moving electrode carried by said belt, said electrode comprising a resilient member having an arcuate effective recording portion for engaging the web, a planar base member arranged to lie adjacent the belt, a cylindrical spring portion integrally interconnecting the resilient member to one end of the base member so that the effective recording portion is yieldingly forced into contact with the web, a clip attached to said belt and having an arcuate end for engaging the cylindrical spring portion pivotally to secure the electrode to said belt, and two resilient tabs extending respectively from two opposite sides of the base member and each having a guiding surface normally disposed to the plane of the base member to position the electrode in a plane parallel to the recording plane of the web whereby the electrode guiding and web contact forces exerted respectively by the resilient tabs and the resilient member act independently of one another.

2. In a recorder of the type having a moving belt guided to travel transversely of a web of recording paper; a moving electrode carried by said belt, said electrode comprising a base member attached to the surface of the belt, two resilient tabs extending respectively from two opposite sides of the base member and each having a guiding surface normally disposed to the surface of the belt to position the electrode in a plane parallel to the recording plane of the web, a resilient member having an arcuate effective recording portion for engaging the web, and a resilient connection between the members for maintaining the members in an angularly disposed relationship with respect to one another and yieldingly forcing the arcuate effective recording portion into contact with the web whereby the electrode guiding and web contact forces exerted respectively by the resilient tabs and the resilient member act independently of one another.

3. In a recorder of the type having a moving belt guided to travel transversely of a web of recording paper; a moving electrode carried by said belt, said electrode comprising a planar base member attached to said belt, said base member having two opposite sides bent upwardly substantially normally to the plane of the member, each side being partially undercut to form a respective resilient tab having a guiding surface for positioning the electrode in a plane parallel to the recording plane of the web, a resilient member having an arcuate effective recording portion for engaging the web, and a resilient integral connection between the members for maintaining the members in an angularly disposed relationship with respect to one another and yieldingly forcing the arcuate effective recording portion into contact with the web whereby the electrode guiding and web contact forces exerted respectively by the resilient tabs and the resilient member act independently of one another.

4. In a recorder of the type having a moving belt guided to travel transversely of a web of recording paper; a moving electrode carried by said belt, said electrode being formed from an integral sheet of a resilient electrically conducting material and comprising a planar base member having means for attaching the member to said belt, and a recording member having an arcuate effective recording portion, the corresponding ends of said members being connected for maintaining the members in an angularly disposed relationship with respect to one another and yieldingly forcing the arcuate effective recording portion into contact with the web, said base member having two of its opposite sides bent upwardly substantially normally to the plane thereof, each side being partially undercut to form a respective tab which lies adjacent a corresponding edge of the recording member, said tabs each having a resilient guiding portion for positioning the electrode in a plane parallel to the recording plane of the web whereby the electrode guiding and web contact forces exerted respectively by the resilient guiding portions of the tabs and the recording member act independently of one another.

5. In a recorder of the type having a moving belt guided to travel transversely of a web of recording paper; a moving electrode carried by said belt, said electrode being formed from an integral sheet of a resilient electrically conducting material and comprising a recording member having an arcuate recording portion for engaging the web, a planar base member arranged to lie adjacent the belt, a cylindrical portion interconnecting one end of the recording member to a corresponding end of the base member for maintaining the members in an angularly disposed relationship with respect to one another and yieldingly forcing the arcuate effective recording portion into contact with the web, and a clip attached to said belt and having an arcuate end for engaging the cylindrical portion pivotally to secure the electrode to said belt, said base member having two opposite sides bent upwardly substantially normally to the plane thereof, each side being partially undercut to form a respective tab which lies adjacent a corresponding edge of the recording edge of the recording member, said tabs each having a resilient guiding portion for positioning the electrode in a plane parallel to the recording plane of the web whereby the electrode guiding and web contact forces exerted respectively by the resilient guiding portions of the tabs and the recording member act independently of one another.

6. In a recorder of the type having a moving belt guided to travel transversely of a web of recording paper; a moving electrode carried by said belt, said electrode comprising an elongated strip of a resilient electrically conducting material angularly folded back upon itself to form two members resiliently disposed with respect to each other, one of the members having means for securing it to the belt, the other member having an arcuate end which acts as an effective recording portion yieldingly contacting the web, and resilient guiding means extending respectively from opposite sides of the member secured to said belt for positioning the electrode in a plane parallel to the recording plane of the web.

7. In a recorder of the type having a moving belt guided to travel transversely of a web of recording paper; a moving electrode carried by said belt, said electrode comprising an elongated strip of a resilient electrically conducting material angularly folded back upon itself to form two members resiliently disposed with respect to each other, one of the members having means for securing it to the belt, the other member having an arcuate end which acts as an effective recording portion yieldingly contacting the web, a block of an elastomer material interposed between said members, one side of the block having an arcuate configuration which conforms to the arcuate end of the effective recording portion thereby to increase the spring gradient of said other member, and resilient guiding means extending respectively from opposite sides of the member secured to said belt for positioning the electrode in a plane parallel to the recording plane of the web.

References Cited in the file of this patent

UNITED STATES PATENTS

| | | |
|---|---|---|
| 2,278,919 | Erickson et al. | Apr. 7, 1942 |
| 2,366,383 | Cameron | Jan. 2, 1945 |
| 2,464,970 | Finch | Mar. 22, 1949 |
| 2,557,196 | Nelson | June 19, 1951 |
| 2,597,199 | Stamper | May 20, 1952 |
| 2,613,124 | Cooley et al. | Oct. 7, 1952 |
| 2,633,405 | Nelson | Mar. 31, 1953 |
| 2,643,173 | Cooley | June 23, 1953 |

FOREIGN PATENTS

| | | |
|---|---|---|
| 702,216 | France | Jan. 19, 1931 |